United States Patent [19]

Onoda

[11] Patent Number: 4,611,215
[45] Date of Patent: Sep. 9, 1986

[54] PEN-RECORDING APPARATUS WITH MULTI-STATION PEN-HOLDING HEAD

[75] Inventor: Hiroshi Onoda, Nagoya, Japan

[73] Assignee: Brother Kogyo Kabushiki Kaisha, Nagoya, Japan

[21] Appl. No.: 640,469

[22] Filed: Aug. 13, 1984

[30] Foreign Application Priority Data

Aug. 20, 1983 [JP] Japan ................................. 58-151977

[51] Int. Cl.⁴ ......................... G01D 9/28; G01D 15/16
[52] U.S. Cl. .................................. 346/49; 346/139 R
[58] Field of Search ...................... 346/49, 136, 139 R, 346/140 R, 141

[56] References Cited

U.S. PATENT DOCUMENTS

4,405,931  9/1983  Fujisawa ................................. 346/49

Primary Examiner—E. A. Goldberg
Assistant Examiner—M. Reinhart
Attorney, Agent, or Firm—Browdy and Neimark

[57] ABSTRACT

A pen-recording apparatus for writing on a sheet of recording medium on a rotatable platen, with plural pens movable with a carriage along the platen. The apparatus comprises a pen-holding head which is supported by the carriage rotatably about an axis perpendicular to a line of movement of the carriage, and which holds the plural pens such that axes of the pens are evenly spaced from each other circumferentially of the head, and such that the pens are axially movable toward and away from the platen. The carriage rotatably supports a pinion coupled to the pen-holding head to transmit a rotary motion to the pen-holding head. The apparatus further comprises a rack member including a rack which is disposed parallel to the platen and engageable with the pinion to rotate the pinion when the carriage is moved in one of opposite directions along the platen. There is provided a device for holding the pinion and the rack out of engagement with each other to prevent the pinion from being rotated by the rack when the carriage is moved in the other direction.

17 Claims, 14 Drawing Figures

PEN-RECORDING APPARATUS WITH MULTI-STATION PEN-HOLDING HEAD

BACKGROUND OF THE INVENTION

The present invention relates in general to a recording apparatus for writing or inscribing representations on a surface with pens or similar writing means. More particularly, the invention is concerned with improvements in a recording apparatus used as a peripheral output device for a computer, business machines or other instruments and having an indexable multi-station pen-holding head which holds plural pens of different colors, types, etc., and which is capable of changing the pens from one to another through movements of a carriage of the apparatus.

As a peripheral output device for computers and other data processing equipment, there are presently available various writing or plotting instruments so-called "pen-plotters" such as those called "X-Y plotters" and "graphic printers, which effect a recording with a pen or pens on a suitable recordng medium to write or inscribe characters (letters, numbers, symbols, etc. to form words, statements, etc.) or to plot or draw figures, drawings, illustrations or any graphical representations desired. In recent years, an increasing demand for color display has been met with a wide spread of multi-color pen-plotters, which use plural or multiple color pens that are automatically selectable. For such multi-color pen-plotters, different types of pen changing mechanisms or systems are proposed. For example, multiple color pens are stored in a storage station which is located near a predetermined recording area of a plotting apparatus, and a selected one of the color pens is held by a pen holder which is movable along X and Y axes as desired. In this system, the pen holder is returned to the storage station each time the color pen is changed from one to another. After a new color pen is installed in the pen holder at the storage station, the pen holder then goes to an original position to resume or continue a writing, plotting or any other desired recording operation. This type of system is complicated in its mechanism for interchanging the color pens. Such complicated pen changing device or mechanism is not applicable or structurally adaptable to a small-sized printer which uses a rotatable platen for holding and feeding a sheet of paper, i.e., recording medium.

There is also known a multi-color (multi-pen) recording apparatus wherein a recording sheet is fed along an X axis through rotation of a platen, while a selected pen is moved along a Y axis through movement of a carriage along the platen. An example of such a recording apparatus is shown in Japanese Patent Application laid open in 1982 under Publication No. 57-89966, wherein a carriage rotatably supports an indexable drum which holds multiple color pens such that their axes are spaced from each other circumferentially of the drum. The indexable drum is provided with a ratchet wheel fixed to the drum body, while a stationary pawl is disposed at one end of the carriage travel. When the carriage is moved close to the stationary pawl, a tooth of the ratchet wheel of the indexable drum comes into engagement with the stationary pawl, whereby the drum is rotated through a predetermined angle corresponding to an angular spacing of the ratchet teeth. In this arrangement, the angular increment of the indexable drum per engagement of the pawl with the ratchet tooth (per reciprocation of the carriage) is limited. Hence, where a comparatively small number of color pens are disposed on the drum, for example, when the drum is adapted to receive four color pens, a single reciprocation of the carriage (i.e., a single engaging action of the pawl with a tooth of the ratchet wheel) is not sufficient to rotate the drum from one station to the next. That is, the carriage must be reciprocated several times to bring the color pen on the next station into position (to change the color of a pen used on the apparatus). Thus, a pen changing device of the above known apparatus requires time-consuming repeated reciprocations of the carriage, and is relatively complicated in mechanism.

SUMMARY OF THE INVENTION

It is accordingly an object of the present invention to provide improvements in a mechanism for indexing a multi-station pen-holding head holding plural pens, for use in a pen-recording apparatus wherein a sheet of recording medium is fed along an X axis by a platen while the pen-holding head is moved along a Y axis together with a carriage which is movable along the platen.

Another object of the invention is to provide such a recording apparatus with a simple mechanism capable of accurately and quickly indexing a multi-station pen-holding head from one station to another through one reciprocating movement of the carriage to change the pens.

A further object of the invention is the provision of such a pen changing mechanism for a multi-station pen-holding head for plural pens of different colors.

According to the present invention, there is provided a pen-recording apparatus for writing on a sheet of recording medium, having a rotatable platen for holding the sheet, and at least one pen movable relative to the platen for writing on the sheet, the pen-recording apparatus comprising: a carriage movable along an axis of the platen; a pen-holding head rotatably supported by the carriage; a pinion rotatably supported by and movable with the carriage; a rack member including a rack disposed parallel to a line of movement of the carriage; and anti-engagement means for holding the pinion and the rack out of engagement with each other. The pen-holding head is rotatable about an axis thereof substantially perpendicular to the line of movement of the carriage, and holds a plurality of pens such that axes of the pens are equiangularly spaced from each other circumferentially of a circle having a center at the axis of the pen-holding head. The pens on the pen-holding head are adapted to be axially movable toward and away from the platen. The pinion rotatable on the carriage is coupled to the pen-holding head to transmit a rotary motion thereof to the pen-holding head. The rack of the rack member is engageable with the pinion to rotate the pinion when the carriage is moved in one of opposite directions along its line of movement, and the anti-engagement means prevents the pinion from being rotated by the rack when the carriage is moved in the other direction.

In the pen-recording apparatus according to the invention constructed as described above, the pinion and the rack engage each other when the carriage is moved in one of the opposite directions along the platen, while the engagement between the pinion and the rack is prevented by the anti-engagement means when the carriage is moved in the other direction. In other words, the pen-holding head is indexed from one station to another during a movement of the carriage in said one direction, but the rotation of the pen-holding head will not take place during a movement of the carriage in the other direction. Thus, the pen-holding head with plural pens can be automatically indexed with ease in a relatively short time, by means of a single reciprocation of the carriage. Obviously, it is arranged that an indexing angle of the pen-holding head per reciprocation of the carriage is equal to an angle of circumferential spacing of the pens so that the pen-holding head is rotated from one station to another to select the next pen each time the carriage is reciprocated.

The pinion may be directly coupled to the pen-holding head or operatively connected to the head via an intermediate gear or gears or the like. In one form of the invention, the pen-holding head is provided with a driven gear fixed to the body of the head and concentric with the circle along which the pens are disposed. The driven gear is held in engagement with the pinion so that the pen-holding head is rotated when the pinion is rotated by the rack through movement of the carriage in said one direction.

According to one advantageous embodiment of the invention, the anti-engagement means comprises a device for moving the rack member toward and away from its retracted position at which the rack is not engageable with the pinion. In one form of this embodiment, the rack member is supported pivotally about an axis thereof parallel to the line of movement of the carriage, and the device for moving the rack member comprises means for pivoting the rack member about the axis thereof.

According to another embodiment of the invention, the anti-engagement means comprises a device for enabling the pinion to move to a position at which the pinion is not engageable with the rack. In one form of this embodiment, the device comprises a lever which is pivotable about the axis of the pen-holding head and which rotatably supports the pinion at a position spaced from the axis of the pen-holding head. The device further comprises a biasing member which biases the lever in a direction that causes the pinion the engage the rack. The biasing member and the level cooperate to prevent disengagement of the pinion from the rack when the carriage is moved in said one direction, but permitting the disengagement of the pinion when the carriage is moved in said other direction.

According to an advantageous form of the invention, the rack member is disposed such that the rack engages the pinion when the carriage has moved in said other direction beyond one end of a predetermined area of recording with the pens on the sheet of recording medium on the platen. In this case, the pen-holding head is indexed each time the carriage is reciprocated past the above one end of the predetermined recording area on the platen.

According to a further advantageous form of the invention, the pen-holding head has plural first engagement portions disposed corresponding to the pens, and the carriage is provided with a resilient member including a second engagement portion which selectively engages the first engagement portions to hold the pen-holding head at a selected one of plural angular positions corresponding to the pens. The first and second engagement portions are adapted such that an engagement of the second engagement portion with one of the first engagement portions is released through elastic deformation of the resilient member when a torque applied to the pen-holding head is greater than a predetermined value.

BRIEF DESCRIPTION OF THE DRAWING

The above and other objects, features and advantages of the invention will be better understood from reading of the following descriptions of preferred embodiments taken in connection with the accompanying drawing in which.

DETAILED DESCRIPTION OF THE PREFERRED EMBODIMENTS

Figure 1:
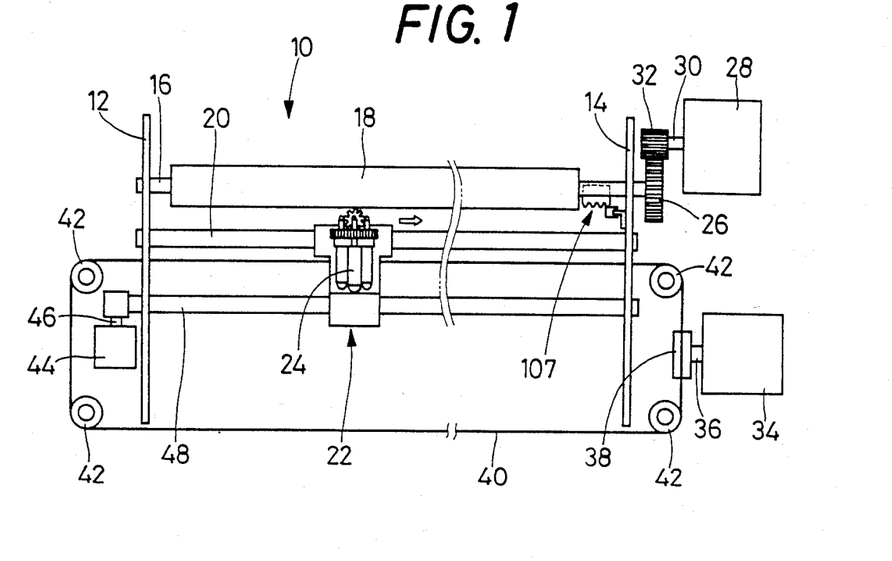
FIG. 1 is a schematic plan view of a general arrangement of a pen-recording apparatus of the invention.

Referring first to FIGS. 1-11, there is shown a first preferred embodiment of the invention, wherein a pen-recording apparatus is generally indicated by reference numberal 10 in FIG. 1. The pen-recording apparatus 10 comprises, as major components thereof: a platen 18 rotatably supported by a pair of opposed frames 12, 14 via a platen shaft 16 concentrically fixed to the platen 18; a carriage 22 which is slidably movable on a guide bar 20 which extends parallel to the axis of the platen 18 between the opposed frames 12, 14; an indexable multi-station pen-holding head 24 supported on the carriage 22 rotatably about its axis substantially perpendicular to a line of movement of the carriage 22 (axis of the platen 18); and a mechanism for indexing the pen-holding head 24. The indexing mechanism includes a rack-and-pinion mechanism (84, 108) which will be described, and anti-engagement means for preventing engagement of the rack-and-pinion mechanism (84, 108) under a predetermined condition, as described later in detail.

To one end of the platen shaft 16 to the right of the frame 14 (in FIG. 1), there is fixed a spur gear 26 which is connected to a first stepper motor 28 (X-axis or platen drive motor) through a drive shaft 30 of the motor 28, and through a pinion gear 32 fixed to the end of the drive shaft 32 and meshing with the spur gear 26. Bidirectional stepping movements of the first stepper motor 28 cause the platen 18 to rotate bidirectionally, whereby a recording medium in the form of a sheet of paper (not shown) placed over the platen 18 is fed in increments along an X axis, i.e., perpendicularly to the axis of the platen 18.

To the right of the frame 14, there is also provided a second stepper motor 34 (Y-axis or carriage drive motor) whose drive shaft 36 is connected to the carriage 22 through a pulley 38 fixed to the drive shaft 36, and through a drive wire 40 which is wound on the pulley 38 and connected at its opposite ends to the carriage 22 as described later. The drive wire 40 is guided by four idler guide pulleys 42 which define four corners of a rectangular path of the drive wire 40. Thus, the carriage 22 and consequently the pen-holding head 24 on the carriage 22 are movable in opposite directions, i.e., reciprocated along a Y axis (along the platen 18) when the second stepper motor 34 is activated in the corresponding directions.

Reference numeral 44 in FIG. 1 designates a solenoid for activating a pen hammer 100 (FIG. 2) which is adapted to push one of color pens 88 on the pen-holding head 24. The structures of the pen hammer 100 and the pen-holding head 24 will be described later in further detail. The solenoid 44 has a plunger 46 which is coupled to a drive rod 48. Upon activation of the solenoid 44, the pen hammer 100 is operated through the drive rod 48 for pushing a currently selected one of the color pens 88 into its writing position so that a recording operation is effected with the selected color pen 88.

Figure 2:
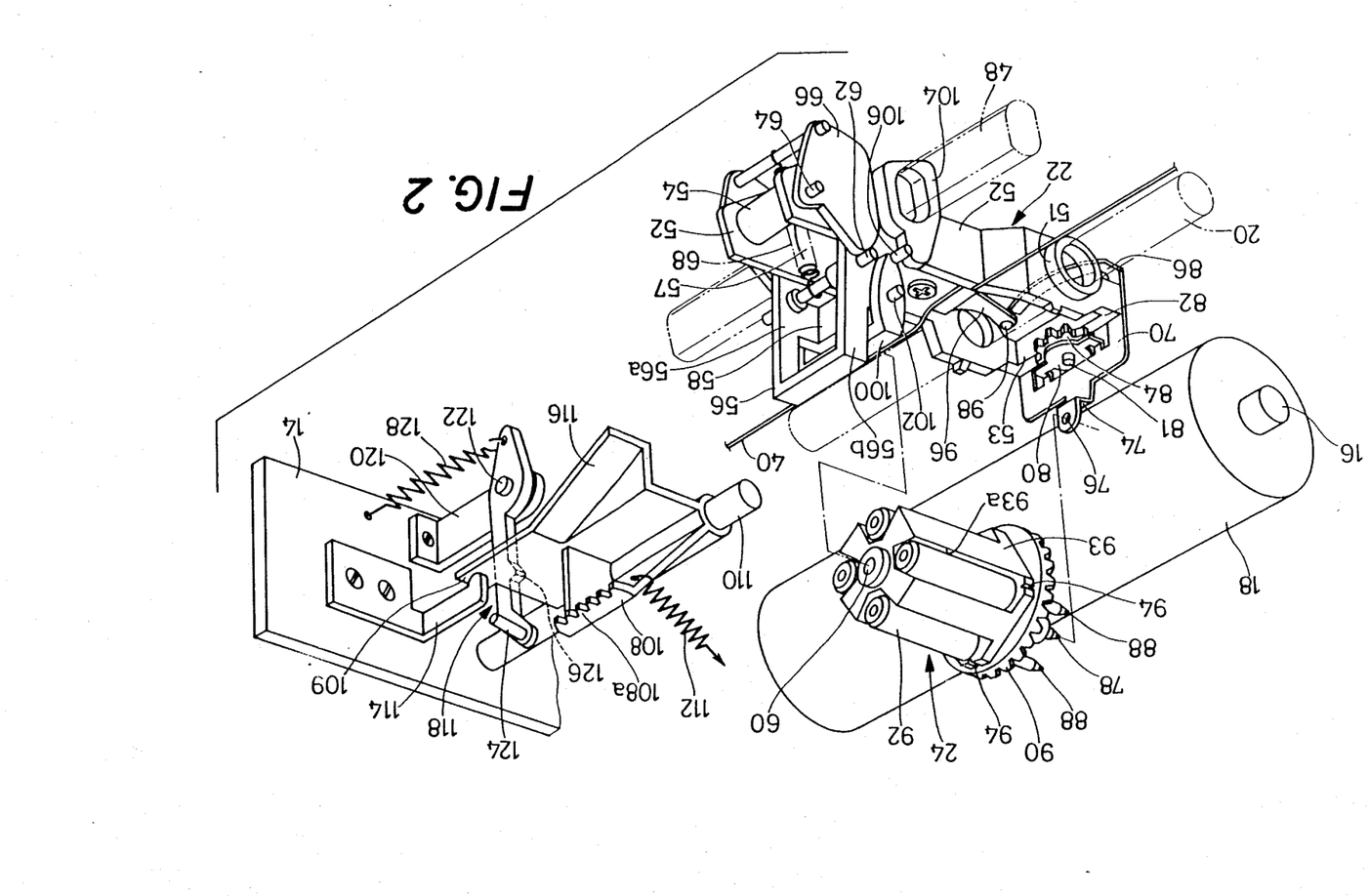
FIG. 2 is a perspective view of one embodiment of the invention, particularly showing a multi-station pen-holding head of the apparatus, and a mechanism for indexing the pen-holding head.
Figure 3:
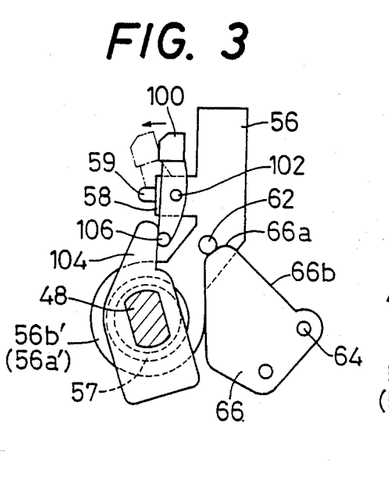
FIGS. 3 and 4 are enlarged side elevational views showing a pivotal head support and a pen hammer of the apparatus.
Figure 4:
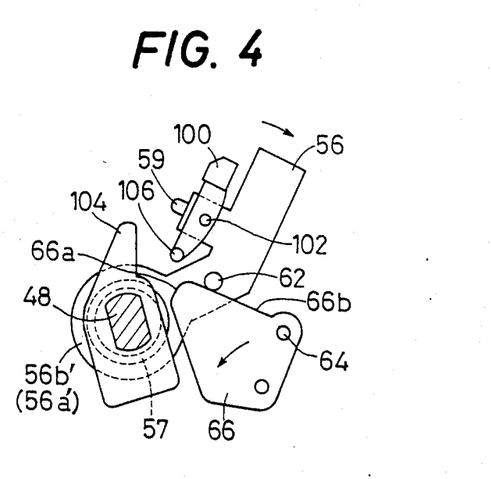

There are illustrated in FIG. 2 the previously indicated carriage 22, pen-holding head 24, pen hammer 100, rack-and-pinion mechanism (84, 108) and other elements of the mechanism for indexing the pen-holding head 24, etc. The carriage 22 includes a pair of opposed base frames 52, 52 having annular bearing portions 51 through which the guide bar 20 is slidably inserted. The opposed base frames 52, 52 are connected at their front ends by a connecting wall 53 and held spaced from each other by a given distance by a spacer sleeve 54 interposed therebetween at their rear ends, such that the two frames 52, 52 are generally parallel to each other. The pen-holding head 24 is rotatably supported by a pivotal head support 56, and by a holder plate 70 which will be described. The pivotal head support 56 has two legs 56a and 56b whose base portions 56a', 56b' (FIGS. 3 and 4) are located adjacent the outer surfaces of the frames 52 so as to sandwich a structure of the frames 52. The pivotal head support 56 is pivotally supported, at the base portions 56a' and 56b', by a pivot sleeve 57 which extends through the walls of the opposed base frames 52, and through the base portions 56a', 56b' as shown in FIGS. 3 and 4. The drive rod 48 extends through the pivot sleeve 57. The pivotal head support 56 has an integral bridge portion 58 which connects the two legs 56a and 56b at their vertically middle portions. The bridge portion 58 is provided, at its central part, with a support pin 59 which points toward the platen 18. As described later in detail, the support pin 59 is received in a round hole 60 formed in the center on the rear end of the pen-holding head 24, and cooperates with a support leg 74 of the holder plate 70 to rotatably support the pen-holding head 24.

A pin 62 extends through the walls of the legs 56a, 56b of the pivotal head support 56 in a direction parallel to the drive rod 48, such that the opposite end portions of the pin 62 project a suitable distance from the outer surfaces of the legs 56a, 56b in opposite directions. These projecting end portions of the pin 62 are held in pressed contact with cam surfaces 66a, 66b of a pair of cam plates 66 which are pitovally connected to the base frames 52 by a pivot pin 64. This pressed contact of the pin 62 is maintained by a tension spring 68 which biases the pivotal head support 56 in a clockwise direction as viewed in FIGS. 2-4. Normally, that is, when the pen-holding head 24 is installed on the carriage 22, the pivotal head support 56 is placed in its upright position of FIG. 3 with the ends of the pin 62 held in contact with the cam surfaces 66a. By pivoting the cam plates 66 counterclockwise from the position of FIG. 3, the projecting ends of the pin 62 slide on the cam surfaces 66a and then on the cam surfaces 66b, and thus the pivotal head support 56 is swiftly pivoted clockwise, under a biasing action of the spring 68, to its inclined position of FIG. 4, whereby the support pin 59 is pulled out of the round hole 60 to allow the pen-holding head 24 to be removed from the carriage 22. When the pen-holding head 24 is mounted on the carriage 22, the head 24 is first positioned between the holder plate 70 and the pivotal head support 56 in its inclined position of FIG. 4. Then, the pivotal head support 56 is pivoted to its upright position of FIG. 3 by throwing the pivotal head support 56 counterclockwise. As a result, the cam plates 66 are pivoted counterclockwise while the ends of the pin 62 are frictionally moved in pressed contact with the cam surfaces 66b. When the ends of the pin 62 have reached the corner between the cam surfaces 66b and 66a, the cam plates 66 are pivoted clockwise to the position of FIG. 3 with the ends of the pin 62 held in contact with the cam surfaces 66a. In this position, the support pin 59 engages the round hole 60 in the pen-holding head 60, and the head 60 is rotatably supported between the holder plate 70 and the pivotal head support 56, as will be further described below.

Referring back to FIG. 2, and as previously indicated, the carriage 22 is provided with the holder plate 70 which is disposed vertically at the front ends of the base frames 52 adjacent to the platen 18. This holder plate 70 is made of a spring material and fixed with a retainer screw 72 (FIG. 5) to the connecting wall 53. The previously indicated support lug 74 is formed as an integral part of the holder plate 70, by folding an upwardly projecting portion of the holder plate 70, such that a through-hole 76 formed in the support lug 74 is in line with the support pin 59 projecting from the opposite pivotal head support 56. The through-hole 76 is adapted to receive a support shaft 78 projecting from the center of the front end of the pen-holding head 24. Thus, the support lug 74 and the support shaft 78 cooperate with the previously described support pin 59 and the round hole 60 to support the pen-holding head 24 rotatably about its axis on the carriage 22.

Figure 5:
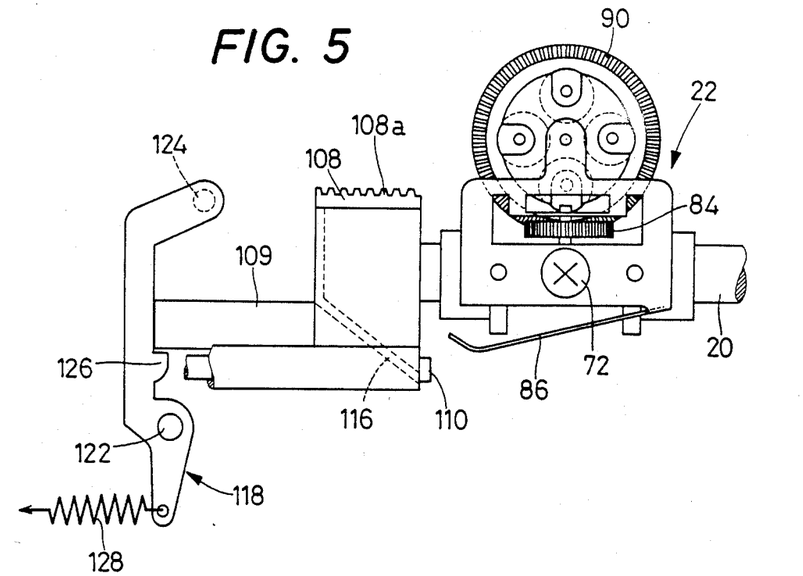
FIG. 5 is a front elevational view of the pen-holding head and its indexing mechanism, taken in a direction from a platen of the apparatus toward the pen-holding head, showing a positional relation between a pinion and a rack of the indexing mechanism of FIG. 2.
Figure 6:
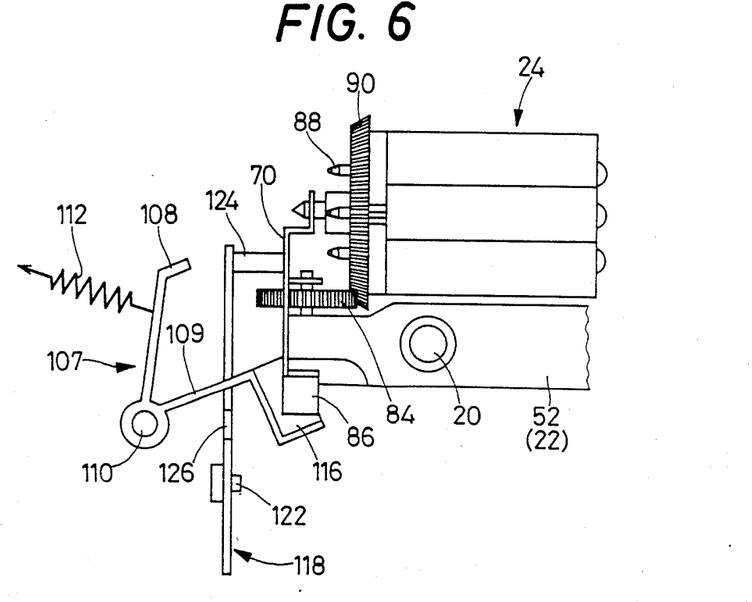
FIG. 6 is a side elevational view of the pen-holding head and the indexing mechanism of FIG. 5.

The holder plate 70 further has an integrally formed bearing plate portion 80 which is folded perpendicularly to the plane of the holder plate 70. A pinion 84 is rotatably supported by a pin 81 which is supported by the bearing plate portion 80 and an upper bearing portion 82 of the connecting wall 53. The pin 81 is perpendicular to the axis of the platen 18 and to the axis of the pen-holding head 24. As shown in FIG. 6, the pinion 84 is held in engagement with an indexing driven gear 90 fixed to the front end of the pen-holding head 24, such that the axis (pin 81) of the pinion 84 is perpendicular to the axis of the driven gear 90 which is aligned with the axis of the pen-holding head 24. Further, the pinion 84 is positioned so that its circumference protrudes from the front face of the holder plate 70 toward the platen 18, as also shown in FIG. 6. The holder plate 70 is further provided with an integral sheet spring portion 86 which is formed so as to extend in a direction parallel to the plane of the holder plate 70 toward the frame 14 and so as to be inclined downwardly as shown in FIG. 5. This sheet spring portion 86 is resiliently engageable with a sloped portion 116 of a rack member 107 which will be described, in order to force down the sloped portion 116 and thereby pivot the rack member 107 in a direction that causes a rack 108a on the rack member 107 to move toward the pinion 84 as the carriage 22 is moved toward the frame 14.

The indexable multi-station pen-holding head 24, which is rotatably supported as previously described, holds the four color pens 88 of different colors which may be a ball-point pen of oleaginous or aqueous ink type. These color pens 88 are accommodated in corresponding cylindrical casings 92 which are equiangularly spaced from each other circumferentially of a circle having a center at the axis of the pen-holding head 24, and are disposed parallel to each other and substantially parallel to the axis of the head 24. Stated more specifically, the pen-holding head 24 has a body 93 of generally rectangular parallelepiped having four parallel recesses 93a formed in the corners of the parallelepiped. The four cylindrical casings 92 are received in these parallel recesses 93a such that the axes of the casings 92, i.e., the axes of the color pens 88 in the casings 92 are circumferentially evenly spaced from each other, that is, in increments of 90 degrees. As shown in FIG. 2, the color pens 88 are supported in the cylindrical casings 92 so that their writing ends project from the front end of the head 24, and so that the color pens 88 are axially movable in the casings 92. The color pens 88 are biased toward the bottom of the casings 92 with springs (not shown) disposed in the casings 92, whereby the color pens 88 are normally held in their retracted position at which their writing ends are spaced away from the sheet of recording paper (not shown) placed over the platen 18. When the writing operation is effected, the selected color pen 88 is moved toward its advanced position under an pressing action of the pen hammer 100, so that the writing end of the pen 88 is held in contact with the sheet of paper.

As briefly described before, the pen-holding head 24 is provided with the indexing driven gear 90 which is concentric with the circle along which the axes of the color pens 88 are evenly spaced. While the pen-holding head 24 is rotatably supported between the holder plate 70 and the pivotal head support 56, the indexing driven gear 90 meshes with the pinion 82 such that their axes are perpendicular to each other. The body 93 of the pen-holding head 24 is provided with four notches 94 (first engagement portions) which are formed in chamfered portions at the four corners of the parallelepiped of the rectangular body 93 and adjacent to the indexing driven gear 90. These notches 94, which are aligned with the angular positions of the color pens 88, are engageable with a hemispherical protuberance 98 (second engagement portion) formed on a resilient tongue 96 which is fixed between the base frames 52 of the carriage 22. This resilient tongue also serves to secure the opposite ends of the drive wire 40 to the carriage 22. With the hemispherical protuberance 98 resiliently engaging one of the notches 94, the pen-holding head 24 is held in place to keep the selected one of the color pens 88 in the writing position. In other words, the notches 94 and the hemispherical protuberance 98 cooperate to constitute a so-called click stop for maintaining the pen-holding head 24 exactly at the selected indexing position. However, a selective engagement of the hemispherical protuberance 98 with the notches 94 is released through elastic deformation or downward yielding of the resilient tongue 96 when a torque applied to the pen-holding head 24 becomes greater than a predetermined value.

As shown in FIGS. 2-4, the pen hammer 100 is supported by the pivotal head support 56 pivotally about a pivot pin 102. The pen hammer 100 is provided at its lower portion with engagement pin 106. These pins 106 project sideways from the pen hammer 100 for engagement with a cam plate 104 which is disposed adjacent the outer surface of the base frames 52. The previously indicated drive rod 48 extends through the cam plate 104 so that a rotary motion of the drive rod 48 is transmitted to the cam plate 104 when the drive rod 48 is activated upon energization of the solenoid 44. When the drive rod 48 is rotated clockwise (in FIG. 3), the cam plate 104 is operated to press the engagement pin 106 in a direction that causes the pen hammer 100 to pivot counterclockwise, as shown in broken line in FIG. 3. With this pivotal movement of the pen hammer 100, the top portion of the hammer 100 pushes the rear end of the currently selected color pen 88 which is located at the highest angular position or station of the pen-holding head 24, whereby the selected color pen 88 is axially moved to its advanced position. The pen hammer 100 is operated and held in its operated position only while a writing or other recording operation is effected with the selected color pen 88. When the platen 18 and/or the carriage 22 are/is moved without the pen 88 contacting the sheet of paper (without a recording action), the solenoid 44 is operated in the reverse direction and the pen hammer 100 is pivoted clockwise to return to its original position. As a result, the color pen 88 is released from a pressure of the pen hammer 100, and returned to to its retracted position with a biasing force of the spring disposed in the cylindrical casing 92.

As shown in FIGS. 1 and 2, the previously introduced rack member 107 is disposed at a position which is located within a travel of the carriage 22, but outside a predetermined area of recording, i.e., to the right of the right-hand side end of the platen 18. This rack member 107 has the rack 108 whose teeth 108a are adapted to engage with the pinion 84 supported on the carriage 22, so that a linear movement of the carriage 22 relative to the rack 108 is converted into a rotary movement of the indexing driven gear 90, that is, an indexing motion of the pen-holding head 24. Described more particularly, the rack member 107 is supported pivotally by a support shaft 110 which is secured to the frame 14 and substantially parallel to the axis of the platen shaft 16. The rack member 107 is biased by a spring 112 in a counterclockwise direction (in FIG. 2). The rack member 107 has an integral planar portion 109 which cooperates with a stop member 114 to limit a counterclockwise pivotal movement of the rack member 107 caused by the biasing force of the spring 112. The stop member 114 is fixed to the frame 14 and located so as to abut on the upper surface of the planar portion 109. The rack member 107 further has an integral sloped portion 116 whose surface is inclined downwardly relative to the planar portion 109, and to the line of movement of the carriage 22, in a direction opposite to that in which the sheet spring portion 86 of the holder plate 70 is inclined. When the carriage 22 is moved toward the frame 14, a free end portion of the inclined sheet spring 86 comes into pressed contact with the surface of the inclined portion 116 and thereby bias the rack member 107 against a resilient force of the spring 112 in the clockwise direction (as viewed in FIG. 2) so that the rack 108 is moved toward the pinion 84, as described later in greater detail.

As shown in FIG. 2, a latch member in the form of a lever 118 is pivotally supported by a pivot pin 122 which is secured to a retainer plate 120 fixed to the frame 14. The lever 118 carries at its upper end a pin 124 which extends perpendicularly to the line of movement of the carriage 22. The lever 118 is formed with an integral stopper portion 126 which is located between the upper end to which the pin 124 is secured, and the intermediate portion at which the lever 118 is pivoted. This stopper portion 126 is engageable with the lower surface of the planar portion 109 of the rack member 107 when the rack member 107 is pivoted clockwise through pressed contact of the sheet spring portion 86 with the sloped portion 116. The lever 118 is biased in a counterclockwise direction by a spring 128 which is connected to the lower end of the lever 118 and the frame 14, whereby the engagement of the stopper portion 126 with the planar portion 109 is maintained.

Referring further to FIGS. 5–11, the operation of the pen-recording apparatus 10 will be described.

While the pen-holding head 24 is rotatably mounted on the carriage 22, the indexing driven gear 90 at the front end of the head 24 is held in engagment with the pinion 84 such that the axes of the driven gear 90 and the pinion 84 are perpendicular to each other, as illustrated in FIG. 6. While the carriage 22 is spaced from the rack member 107 along the Y axis or platen 18 as shown in FIG. 5, the rack member 107 which is biased counterclockwise by the spring 112 is placed in its non-operated or released position at which its rack 108 is slightly inclined upwardly obliquely and spaced away from the pinion 84 as shown in FIG. 6. This non-operated position is maintained through abutment of the stop member 114 on the upper surface of the planar portion 109 (FIG. 2). In this condition, there is maintained a predetermined clearance between the lower surface of the planar portion 109 of the rack member 107 and the stopper portion 126 of the lever 118 as depicted in FIGS. 5 and 6. At the same time, the pin 124 on the lever 118 is spaced a considerable distance from the holder plate 70 on the carriage 22 in the Y-axis direction along the platen 18.

Figure 7:
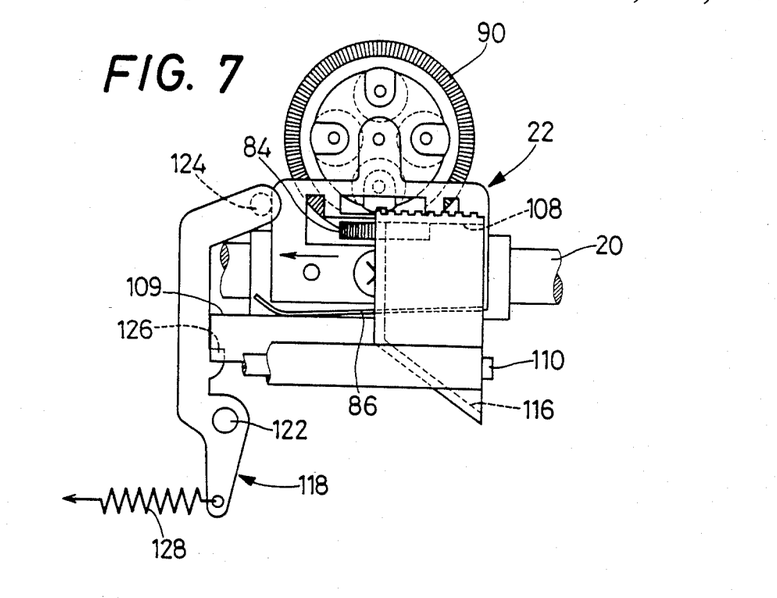
FIGS. 7 and 8 are front and side elevational views, corresponding to FIGS. 5 and 6, after the carriage has been moved from the position of FIG. 5.
Figure 8:
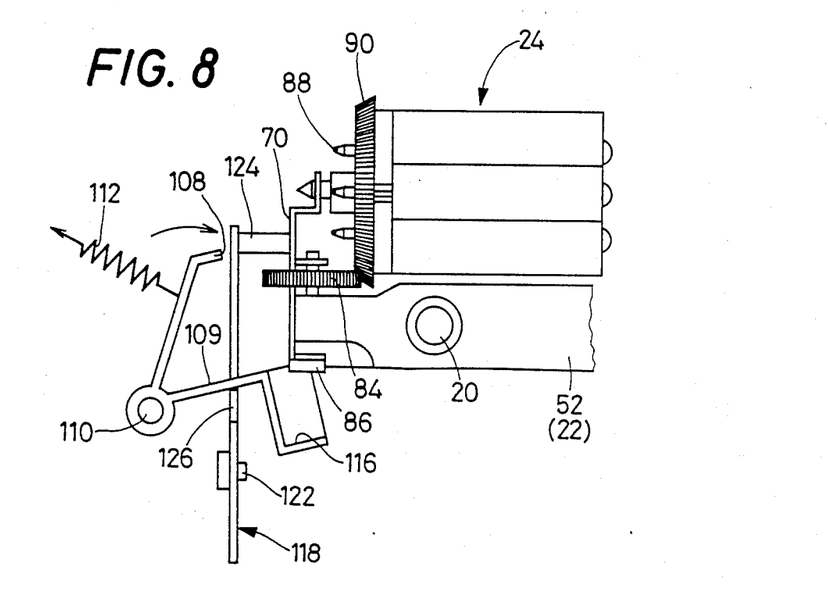

The indexing operation of the pen-holding head 24 for changing the color pens 88 from one to another is performed in the following manner:

When it is desired to change the currently selected color pen 88 of one color to another of another color, the carriage 22 is moved toward the frame 14 (toward the rack member 107) beyond the right-hand side end of the predetermined area of recording on the platen 18. This movement is achieved with a pulling force of the wire 40 produced by activation of the second stepper motor 34. More specifically, the carriage 22 is moved from the position of FIG. 5 toward the position of FIG. 7. During this movement, the sheet spring portion 86 approaches the sloped portion 116 of the rack member 107 in the non-operated position of FIG. 6, and comes into pressed contact with the sloped portion 116 and finally with the upper surface of the planar portion 109 as shown in FIG. 7. In this respect, it is noted that the biasing force of the sheet spring portion 86 is selected to be greater than the biasing force of the spring 112. For this reason, the sliding contact of the sheet spring portion 86 on the rack member 107 will cause the rack member 107 to pivot clockwise. As the free end of the sheet spring portion 86 climbs the sloped portion 116, the sheet spring portion 86 is deformed into a flexed state and acquires an elastic strain energy for biasing the rack member 107 against the resilient force of the spring 112. When the carriage 22 is moved to a position at which the free end of the sheet spring portion 86 contacts the planar portion 109, the lower surface of this planar portion 109 comes into abutment on the stopper portion 126 formed on the lever 118, as shown in FIGS. 7 and 8, whereby the clockwise pivotal movement of the rack member 107 is limited by the stopper portion 126. In this position of FIG. 8, the teeth 108a of the rack 108 is slightly spaced from the teeth of the pinion 84, and the left-hand side end (in FIG. 7) of the holder plate 70 is spaced a very small distance away from the pin 124 on the lever 118.

Figure 9:
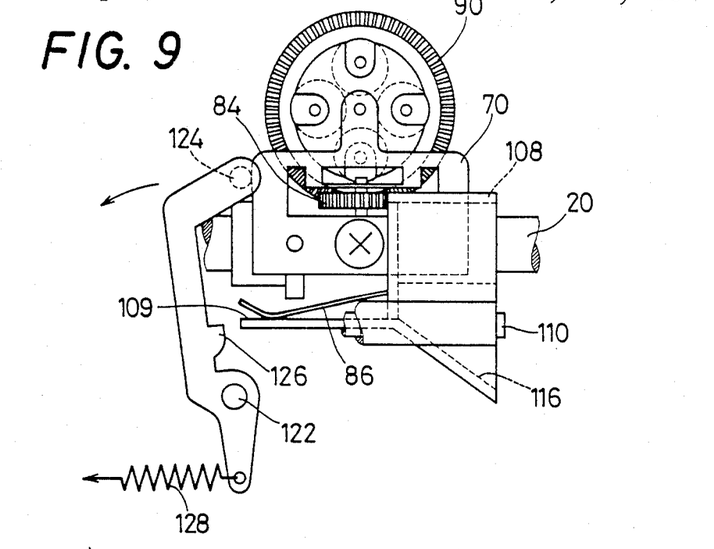
FIGS. 9 and 10 are front and side elevational views, also corresponding to FIGS. 5 and 6, after the carriage has been moved a further distance from the position of FIG. 7.
Figure 10:
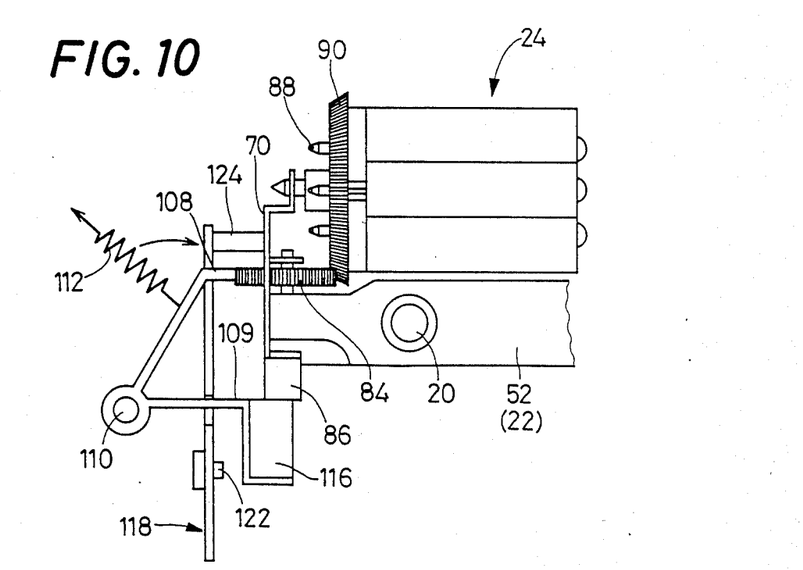

When the carriage 22 is moved a further distance from the position of FIG. 7 toward the frame 14 as indicated by an arrow in FIG. 7, the end of the holder plate 70 comes into abutment on the pin 124, and causes the lever 118 to pivot counterclockwise as shown in FIG. 9. As a result, the stopper portion 126 of the lever 118 is disengaged from the planar portion 109, that is, the rack member 107 is unlatched, and therefore the rack member 107 is pivoted clockwise through a further angle about the support shaft 110 with the elastic strain energy of the flexed sheet spring portion 86 whose biasing force is greater than that of the spring 112. Consequently, the rack 108 is brought into engagement with the pinion 84 as shown in FIGS. 9 and 10. In this condition, however, the rack 108 does not engage the pinion 84 over its entire width. In other words, when the carriage 22 is moved to the position at which the rack member 107 is unlatched off the stopper portion 126 and the rack 108 is brough into mesh with the pinion 84, the center of the pinion 84 is past the left end (FIG. 9) of the rack 108, i.e., the rack 108 is offset from the center of the pinion 84 so that the movement of the carriage 22 from this position back to the recording area (away from the frame 24) will enable the currently unengaged portion of the rack 108 to engage with the teeth of the pinion 84.

Figures 11, 13:
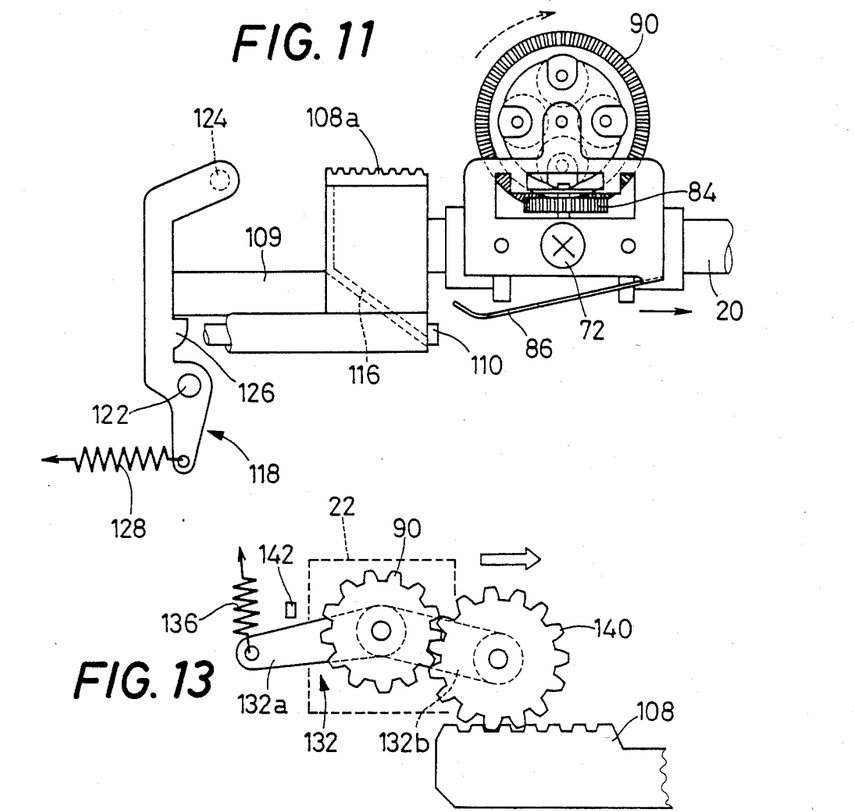
FIG. 11 is a front elevational view corresponding to FIG. 5, after the carriage has been moved in the reverse direction from the position of FIG. 9 to the position of FIG. 5 to index the pen-holding head.
FIGS. 13 and 14 are schematic views showing a pinion and a rack of the indexing mechanism of FIG. 12, in different operational positions.

When the carriage 22 has been moved to the position of FIG. 9, suitable position sensing means is activated to produce a signal for reversing the operating direction of the second stepper motor 34. The carriage 22 is thus moved in the reverse direction away from the frame 14, and the pinion 84 engaging the rack 108 is forcibly rotated by the rack 108 through a predetermined angle, whereby the indexing drive gear 90 is rotated through 90 degrees, with a result of indexing the pen-holding head 24 from the currently selected station to the next. In this manner, the color pen 88 next to the currently selected color pen 88 is brought into the writing position at the top of the head 24. Thus, an indexing action of the pen-holding head 24 takes place while the carriage 22 is returned from the position of FIG. 9 outside the recording area, toward the recording area, i.e., to the position of FIG. 11. Before the carriage 22 has reached the position of FIG. 11, the sheet spring portion 86 is disengaged from the sloped portion 116 of the rack member 107 as shown in FIG. 11, and the rack member 107 is pivoted counterclockwise back to its non-operated or released position of FIG. 6 with the biasing force of the spring 112. Thus, the engagement of the rack 108 with the pinion 84 is automatically released, and the indexing mechanism which has been described becomes ready for the next indexing cycle.

When the carriage 22 is located within the recording area, and a recording command is generated to effect a writing or other recording operation with the selected color pen 88, the solenoid 44 is energized and the drive rod 48 is rotated, whereby the pen hammer 100 is pivoted to push the end of the currently selected color pen 88 located at the top station of the head 24. Consequently, the pushed color pen 88 is moved to its advanced position, and a recording operation with this pin 88 is made possible with the writing tip held in contact with the surface of the recording sheet, as previously indicated. Stated in a little more detail, the recording operation is accomplished through a two-dimensional movement of the color pen 88 relative to the recording sheet which is obtained by an X-axis feeding motion of the recording sheet through rotation of the platen 18 by means of the first stepper motor 28, and a Y-axis movement of the carriage 22 along the platen 18 by means of the second stepper motor 34.

Figure 12:
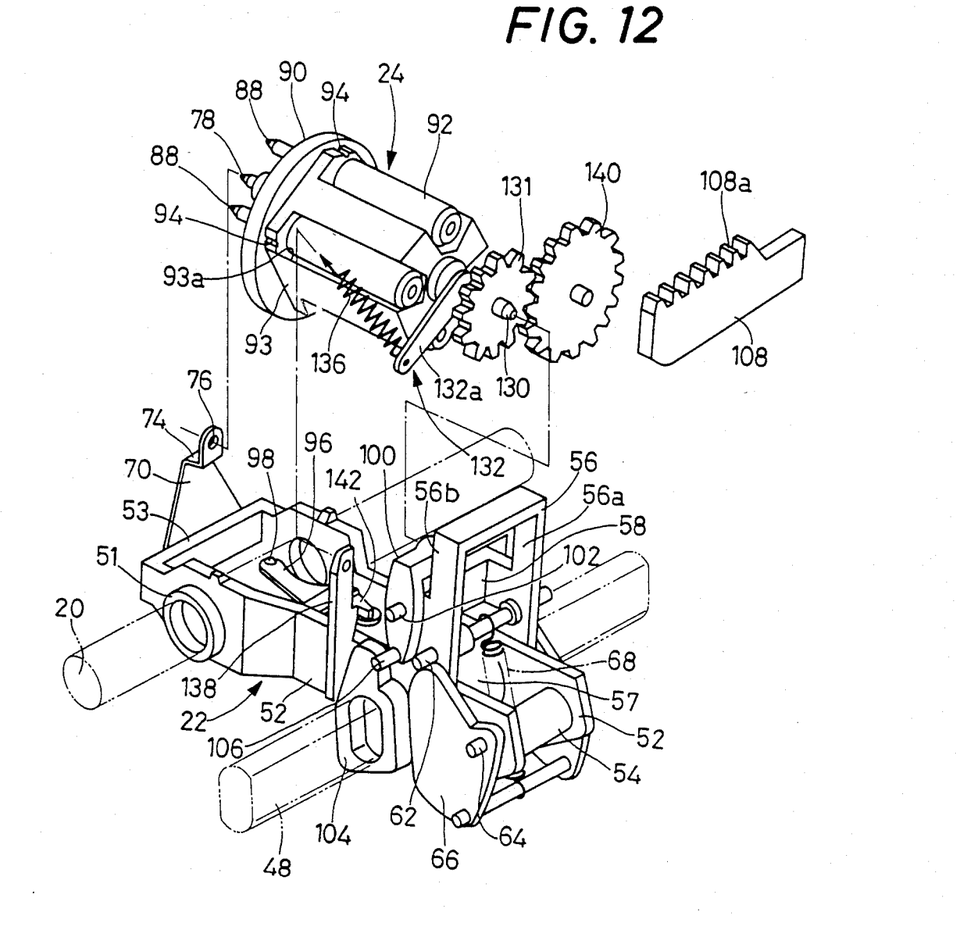
FIG. 12 is an perspective view of another embodiment of the invention using a modified mechanism for indexing the pen-holding head.
Figure 14:
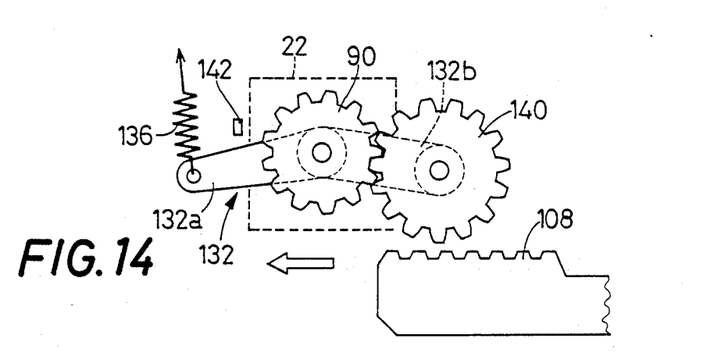

Referring next to FIGS. 12–14, another preferred embodiment of the invention will be described.

This alternative embodiment is different from the preceding embodiment mainly in the rack-and-pinion mechanism for indexing the pen-holding head 24 by means of converting a linear movement of the carriage 22 into a rotary movement of the head 24. The same reference numerals as used in FIGS. 2–11 are used in FIGS. 12–14 to identify the corresponding elements, and the description of these elements is omitted herein. The pen-holding head 24 of this embodiment is provided with a center shaft 130 which is fixed in the round hole 60 (FIG. 2) and projects from the rear end of the head 24. When the head 24 is mounted on the carriage 22, this center shaft 130 is received in a mating hole (not shown) formed in the bridge portion 58 of the pivotal head support 56. Thus, the pen-holding head 24 is rotatably supported by the pivotal head support 56 and the support lug 74. To the center shaft 130 is fixed an indexing driven gear 131 for rotation thereof together with the center shaft 130. Further, a bell-crank lever 132 having two arms 132a, 132b is fixed to the center shaft 130 such that it is pivotable about the center shaft 130. One end of the arm 132a is connected through a tension spring 136 to a post 138 fixed vertically to one of the base frames 52. The other arm 132b carries a pinion 140 such that the pinion 140 is rotatable about its axis and held in mesh with the indexing driven gear 131. In the middle of the post 138, there is provided an integrally formed stopper portion 142 which serves to stop the arm 132a biased by the spring 136, i.e., to limit a clockwise pivotal movement of the arm 132a so that the pinion 140 is maintained at a predetermined level relative to the rack 108.

A rack 108 having teeth 108a is fixed at a position within a travel range of the carriage 22 but outside the predetermined recording area, i.e., to the right of the right-hand side end of the platen 18. This rack 108 is adapted to engage the pinion 140 when the carriage 22 is moved toward the frame 14.

The operation of the second embodiment of FIGS. 12–14 will be briefly described.

When the carriage 22 is moved toward the frame 14 and past the right-hand side end of the recording area, the pinion 140 contacts the end of the rack 108 and then engages the rack teeth 108a through aid of a biasing force of the tension spring 136 which biases the arm 132b to pivot clockwise, i.e., in a direction that causes the pinion 140 to be held in engagement with the rack 108. With the pinion 140 engaging the rack teeth 108a, the movement of the carriage 22 will cause the pinion 140 to rotate through a predetermined angle, which causes the indexing driven gear 131 to rotate through 90 degrees, whereby the pen-holding head 24 is indexted from one station to the next, and the new color pen 88 next to the currently selected one is broght into the writing position.

When the carriage 22 is returned toward the recording area after completion of the indexing cycle of the pen-holding head 24, the pinion 140 steps over the individual rack teeth 108a, i.e., moves without an rotating motion thereof due to engagement with the rack 108. Stated in more detail, the pen-holding head 24 is held in place through engagement of the hemispherical protuberance 98 with the appropriate notch 94. A resilient force of the resilient tongue 96 is so determined that the engagement of the protuberance 98 with the notch 94 is released by a torque applied to the pen-holding head 24 when the pinion 140 engages the rack 108 during movement of the carriage 22 in the direction indicated by an arrow of FIG. 13, but not released by a torque when the pinion 140 engages the rack 108 during movement of the carriage 22 in the direction indicated by an arrow of FIG. 14. The movement of the pinion 140 in the latter direction of FIG. 14 with the carriage 22, produces a force to rotate the pinion 140 counterclockwise. At the same time, this force applied to the pinion 140 acts to cause the bell-crank lever 132 to rotate counterclockwise, i.e., in a direction that causes the pinion 140 to move away from the rack 108. As discussed previously, the engagement of the protuberance 98 with the notch 94 provides a resistance to rotation of the pen-holding head 24 and consequently a resistance to rotation of the pinion 140. In the meantime, the spring 136 provides a resistance to counterclockwise rotation of the bell-crank lever 132, i.e., a resistance to movement of the pinion 140 away from the rack teeth 108a. Since the resistance to the rotation of the pinion 140 due to engagement between the protuberance 98 and the notch 94 is adapted to be greater than the resistance to the counterclockwise rotation of the lever 132 due to a biasing force of the spring 136, the lever 136 is pivoted counterclockwise before the pinion 140 is rotated. That is, while the carriage 22 and the pinion 140 are moved in the direction of FIG. 14, the pinion 140 is forced a small distance away from the surfaces of the rack teeth 108a, and the tooth or teeth of the pinion 140 engaging the rack 108 skip over the rack teeth 108a, whereby the pinion 140 is moved relative to the rack 108 in the direction of FIG. 14, and without rotation thereof on the arm 132b. Thus, the pinion 140 is disengaged from the rack 108 without rotating the pen-holding head 24.

As described above, the pen-holding head 24 is indexed through rotation of the pinion 140 by the rack 108 during the movement of the carriage 24 toward the frame 14, but the reverse movement of the carriage 22 will not cause the pen-holding head 24 to be indexed in the reverse direction for the reason stated above.

While the present invention has been described in its preferred embodiments, it is to be understood that the invention is not limited thereto; but may be otherwise embodied within the scope of the invention defined in the appended claims.

For example, the pen-holding head 24 may be modified to hold more than four color pens such that the axes thereof are equiangularly spaced from each other circumferentially of the head 24. In this instance, the length of the rack 108, the number of teeth of the pinion 84 or 140, etc. are modified so that an angle of each indexing motion is equal to an angle of circumferential spacing between the adjacent color pens, i.e., 360 degrees divided by the number of the color pens carried on the head 24.

Although the illustrated embodiments uses the indexing driven gear 90 or 131 for connecting the pinion 84 or 140 to the body 93 of the pen-holding head 24, it is possible that a pinion or other suitable indexing member is integrally formed on or fixed to the pen-holding head 24 so that such pinion or indexing member directly engage a rack.

Further, the cylindrical casings 92 are used to accommodate the color pens 88 of different colors, it is appreciated that the casings 92 or other suitable casing means be adapted to accommodate pens of different types, or sizes.

What is claimed is:

1. A pen-recording apparatus for writing on a sheet of recording medium, having a rotatable platen for holding the sheet, and at least one pen movable relative to the platen for writing on the sheet, said pen-recording apparatus comprising:
   a carriage, movable along an axis of said platen;
   a pen-holding head supported by said carriage and rotatable about an axis thereof substantially perpendicular to a line of movement of said carriage, said pen-holding head holding a plurality of pens such that axes of said pens are equiangularly spaced from each other circumferentially of a circle having a center at said axis of the pen-holding head, said pens being axially movable toward and away from said platen;
   drive means for moving said carriage along said line of movement of the carriage;
   a pinion rotatably supported by and movable with said carriage, and coupled to said pen-holding head to transmit a rotary motion thereof to the pen-holding head;
   a rack member including a rack disposed parallel to said line of movement of the carriage, said rack being engageable with said pinion and rotating the pinion when said carriage is moved by said drive means in one of opposite directions along said line of movement thereof, said rack having a sufficient length so that a rotary motion of said pinion caused by each movement of said carriage relative to said rack in said one direction causes said pen-holding head to rotate through an angle equal to an angle of circumferential spacing of said pens; and
   anti-engagement means for holding said pinion and said rack out of engagement with each other to prevent said pinion from being rotated by said rack when said carriage is moved by said drive means in the other direction.

2. A pen-recording apparatus as claimed in claim 1, wherein said pinion is held in engagement with a driven gear which is fixed to said pen-holding head and concentric with said circle, said rotary motion of said pinion caused by movement of said carriage relative to said rack in said one direction causing said driven gear to rotate through an angle equal to an angle of circumferential spacing of said pens.

3. A pen-recording apparatus as claimed in claim 1, wherein said anti-engagement means comprises a device for moving said rack member toward and away from a retracted position thereof at which said rack is not engageable with said pinion.

4. A pen-recording apparatus as claimed in claim 3, wherein said rack member is supported pivotally about an axis thereof parallel to said line of movement of said carriage, said device for moving the rack member comprising means for pivoting said rack member about the axis thereof.

5. A pen-recording apparatus as claimed in claim 3, wherein said device for moving the rack member comprises:
   a first resilient member biasing said rack member toward said retracted position thereof;
   a second resilient member provided on said carriage and engaging said rack member when said carriage is moved in said other direction thereof, to bias said rack member against a resilient force of said first resilient member in an engaging direction that causes said rack to engage with said pinion;
   latch means engageable with said rack member when the rack member is biased by said second resilient member in said engaging direction, said latch means stopping a pivotal movement of said rack member in said engaging direction, at a latch position at which said rack is slightly spaced from said pinion, and holding said rack member at said latch position; and
   an unlatching member provided on said carriage and abuttable on said latch means, upon movement of said carraige in said other direction to a predetermined position, to unlatch said rack member latched by said latch means, thereby permitting said rack to move for engagement with said pinion, said pinion being rotated by said rack while said carriage is moved in said one direction after said rack member is unlatched off said latch means.

6. A pen-recording apparatus as claimed in claim 5, wherein said rack member has a sloped portion whose surface is inclined with respect to said line of movement of the carriage, and said carriage comprises said second resilient member in the form of a sheet spring which is inclined in a direction opposite to that in which said sloped portion of the rack member is inclined, said sheet spring being deformed into a flexed state to acquire an elastic strain energy with a free end portion thereof in contact with the inclined surface of said sloped portion when the carriage is moved in said other direction, whereby said rack member is biased by said sheet spring in said engaging direction when said carriage is moved in said other direction.

7. A pen-recording apparatus as claimed in claim 5, wherein said latch means comprises a latch member disposed pivotally in a plane parallel to said line of movement of said carriage, and further comprises a third resilient member biasing said latch member in a direction that causes the latch member to engage said rack member, said latch member having a stopper portion engageable with said rack member to limit the pivotal movement of the rack member in said engaging direction.

8. A pen-recording apparatus as claimed in claim 1, wherein said pen-holding head has a plurality of first engagement portions disposed corresponding to said plurality of pens and in an equiangularly spaced relation with each other with the same circumferential spacing angle as said pens, and said carriage is provided with a resilient member including a second engagement portion which selectively engages said plurality of first engagement portions to hold said pen-holding head exactly at a selected one of plural angular positions corresponding to said pens, an engagement of said second engagement portion with each of the first engagement portions being released through elastic deformation of said resilient member when a torque applied to said pen-holding head is greater than a predetermined value.

9. A pen-recording apparatus as claimed in claim 1, wherein said rack member is disposed such that said rack engages said pinion when said carriage has moved in said other direction beyond one end of a predetermined area of recording with said pens on said sheet on said platen.

10. A pen-recording apparatus as claimed in claim 1, wherein said anti-engagement means comprises a device for enabling said pinion to move to a position at which said pinion is not engageable with said rack.

11. A pen-recording apparatus as claimed in claim 10, wherein said device comprises a lever which is pivotable about the axis of said pen-holding head and which rotatably supports said pinion at a position spaced from said axis of the pen-holding head, said device further comprises a biasing member which biases said lever in a direction that causes said pinion to engage said rack, said biasing member and said lever preventing disengagement of said pinion from said rack when said carriage is moved in said one of opposite directions, but permitting said disengagement of the pinion when said carriage is moved in said other direction.

12. A multi-station indexing device for a pen-recording apparatus which has a platen for holding a sheet, a carriage movable along an axis of the platen, a multi-station pen-holding head supported by the carriage and rotatable about an axis thereof substantially perpendicular to a line of movement of the carriage, and a plurality of pens held by the pen-holding head such that axes of the pens are equiangularly spaced from each other in the periphery of the pen-holding head, comprising:
    drive means for moving said carriage along said line of movement of said carriage;
    a pinion rotatably supported by and movable with said carriage, and coupled to said pen-holding head to transmit a rotary motion thereof to the pen-holding head;
    a rack member including a rack and supported pivotally about an axis thereof parallel to said line of movement of said carriage;
    a first resilient member pivotally biasing said rack member toward a retracted position thereof at which said rack is not engageable with said pinion;
    a second resilient member provided on said carriage and deformed to acquire an elastic strain energy with a free end portion thereof in contact with said rack member when said carrige is moved in one of opposite directions along said line of movement thereof, so as to pivotally bias said rack member against a resilient force of said first resilient member in an engaging direction for engaging of said rack with said pinion;
    latch means engageable with said rack member when the rack member is pivotally biased by said second resilient member in said engaging direction, said latch means stopping a pivotal movement of said rack member in said engaging direction, at a latch position at which said rack is slightly spaced from said pinion, and holding said rack member at said latch position; and
    an unlatching member provided on said carriage and abuttable on said latch means when said carriage is moved in said one direction to a predetermined position, so as to unlatch said rack member which has been latched by said latch means, thereby permitting said rack member to further pivot about an axis thereof into an engagement position thereof at which said rack is engageable with said pinion, said rack rotating said pinion when said carriage is moved by said drive means in the other direction after unlatching of said rack member apart from said latch means, said rack having a sufficient length so that a rotary motion of said pinion caused by each movement of said carriage relative to said rack in said other direction causes said pen-holding head to rotate through an angle equal to an angle of circumferential spacing of said pens.

13. A multi-station indexing device as claimed in claim 12, wherein said pinion is held in engagement with a driven gear which is fixed to said pen-holding head and has its center on a longitudinal axis of said pen-holding head, said rotary motion of said pinion caused by movement of said carriage relative to said rack causing said driven gear to rotate.

14. A multi-station indexing device as claimed in claim 12, wherein said rack member has a sloped portion whose surface is inclined with respect to said line of movement of the carriage, and said carriage comprises said second resilient member in the form of a sheet spring which is inclined in a direction opposite to that in which said sloped portion of the rack member is inclined, said sheet spring being deformed into a flexed state to acquire an elastic strain energy with a free end portion thereof in contact with the inclined surface of said sloped portion when the carriage is moved in said one direction, whereby said rack member is biased by said sheet spring in said engaging direction when said carriage is moved in said one direction.

15. A multi-station indexing device as claimed in claim 12, wherein said latch means comprises a latch member disposed pivotally in a plan parallel to said line of movement of said carriage, and further comprises a third resilient member biasing said latch member in a direction that causes the latch member to engage said rack member, said latch member having a stopper portion engageable with said rack member to limit the pivotal movement of the rack member in said engaging direction.

16. A multi-station indexing device as claimed in claim 12, wherein said pen-holding head has a plurality of first engagement portions disposed corresponding to said plurality of pens and in an equiangularly spaced relation with each other with the same circumferential spacing angle as said pens, and said carriage is provided with a resilient member including a second engagement portion which selectively engages said plurality of first engagement portions to hold said pen-holding head exactly at a selected one of plural angular positions corresponding to said pens, an engagement of said second engagement portion with each of the first engagement portions being released through elastic deformation of said resilient member when a torque applied to said pen-holding head is greater than a predetermined value.

17. A multi-station indexing device as claimed in claim 12, wherein said rack member is disposed such that said rack engages said pinion when said carriage has moved in said one direction beyond one end of a predetermined area of recording with said pens on said sheet on said platen.

* * * * *